July 17, 1928.
C. E. RETT
1,677,207
CONTINUOUS VULCANIZER
Original Filed Jan. 29, 1921   7 Sheets-Sheet 5
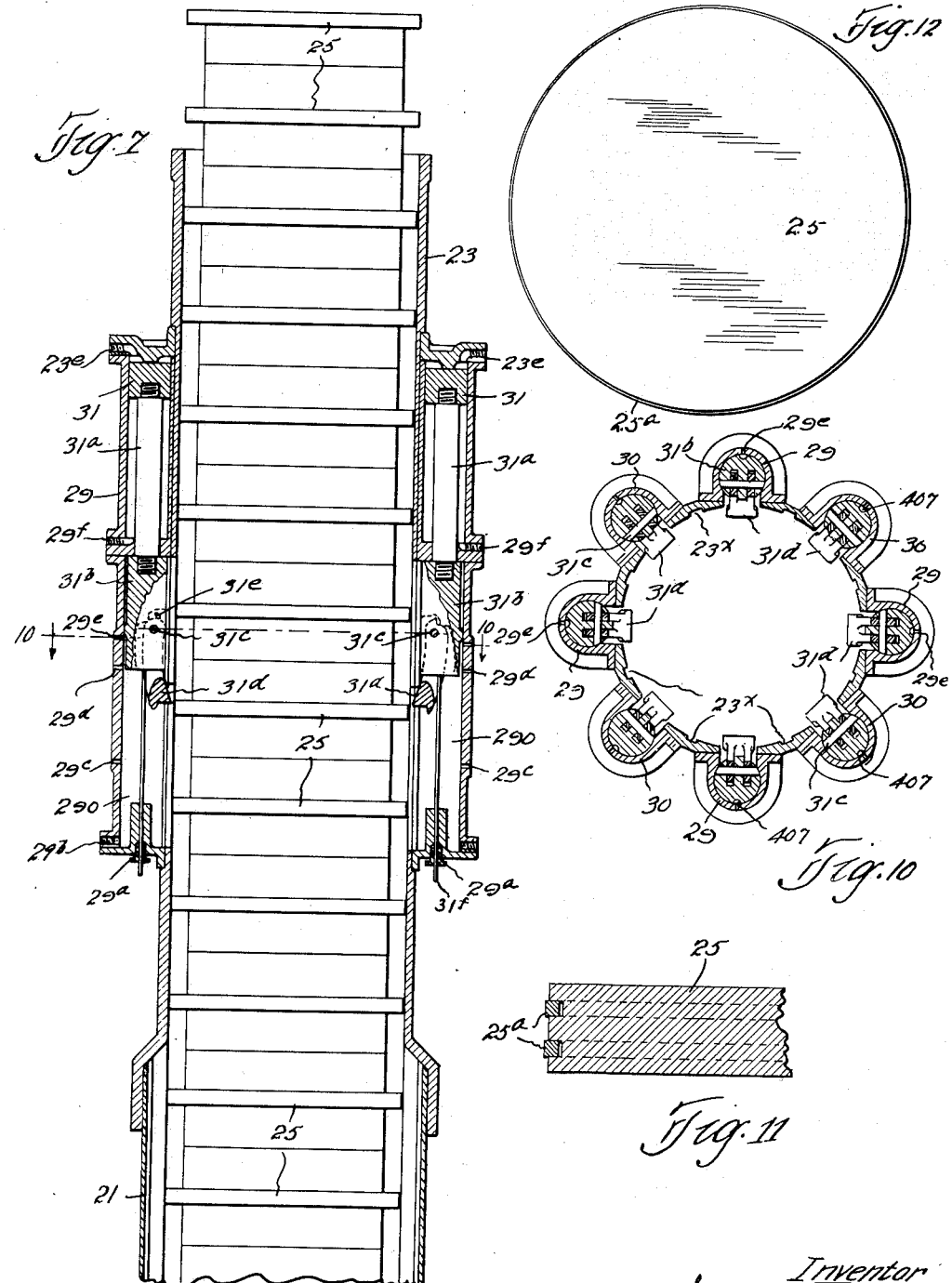

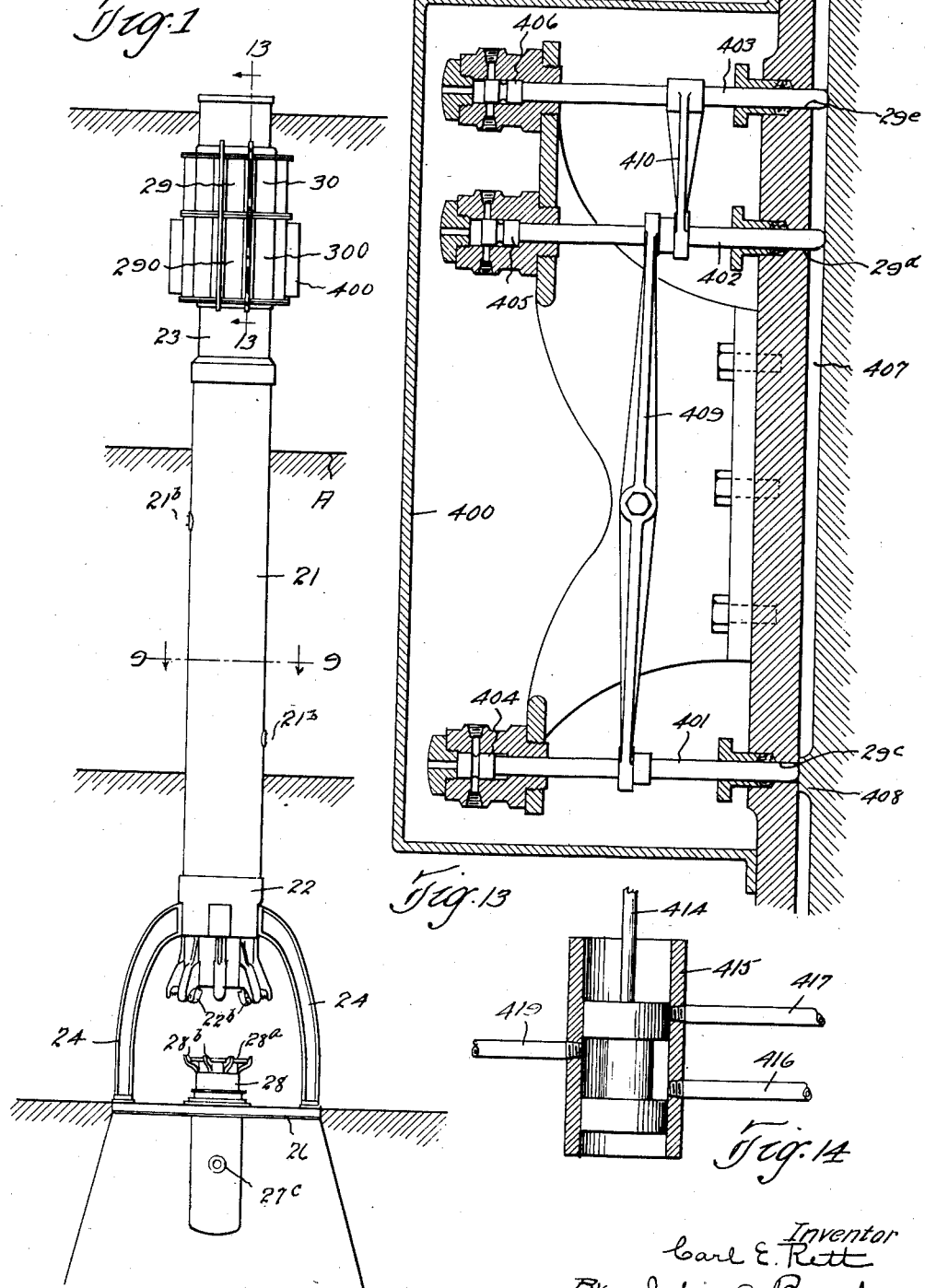

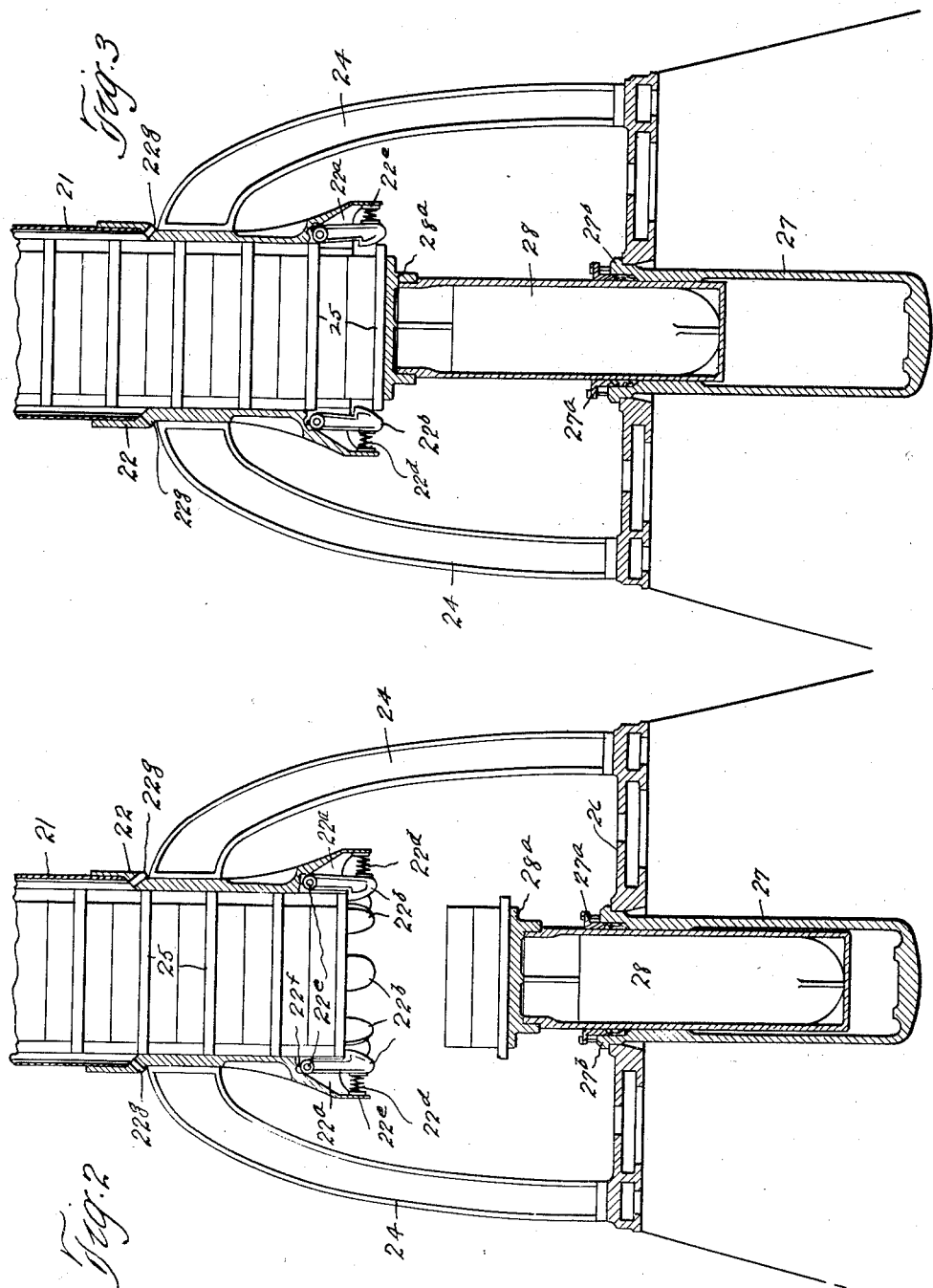

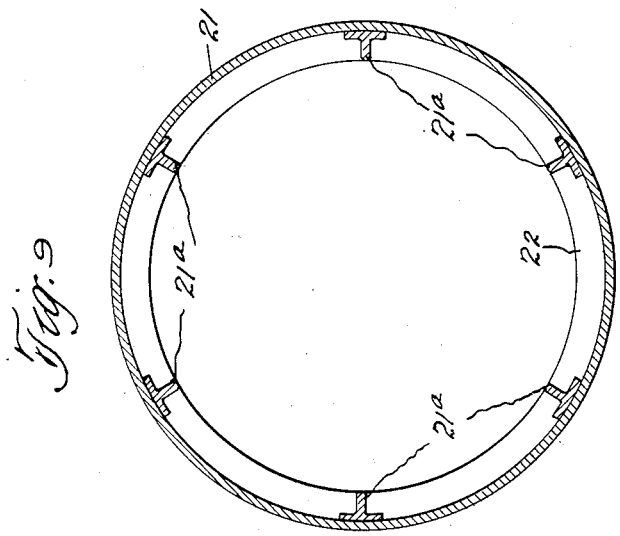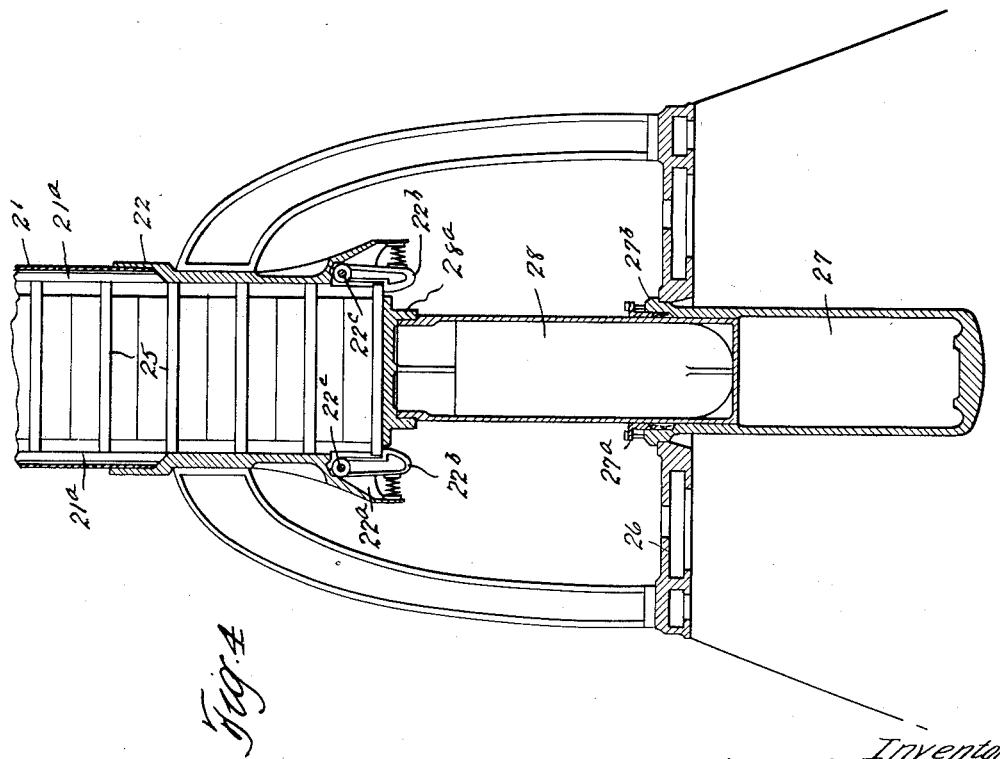

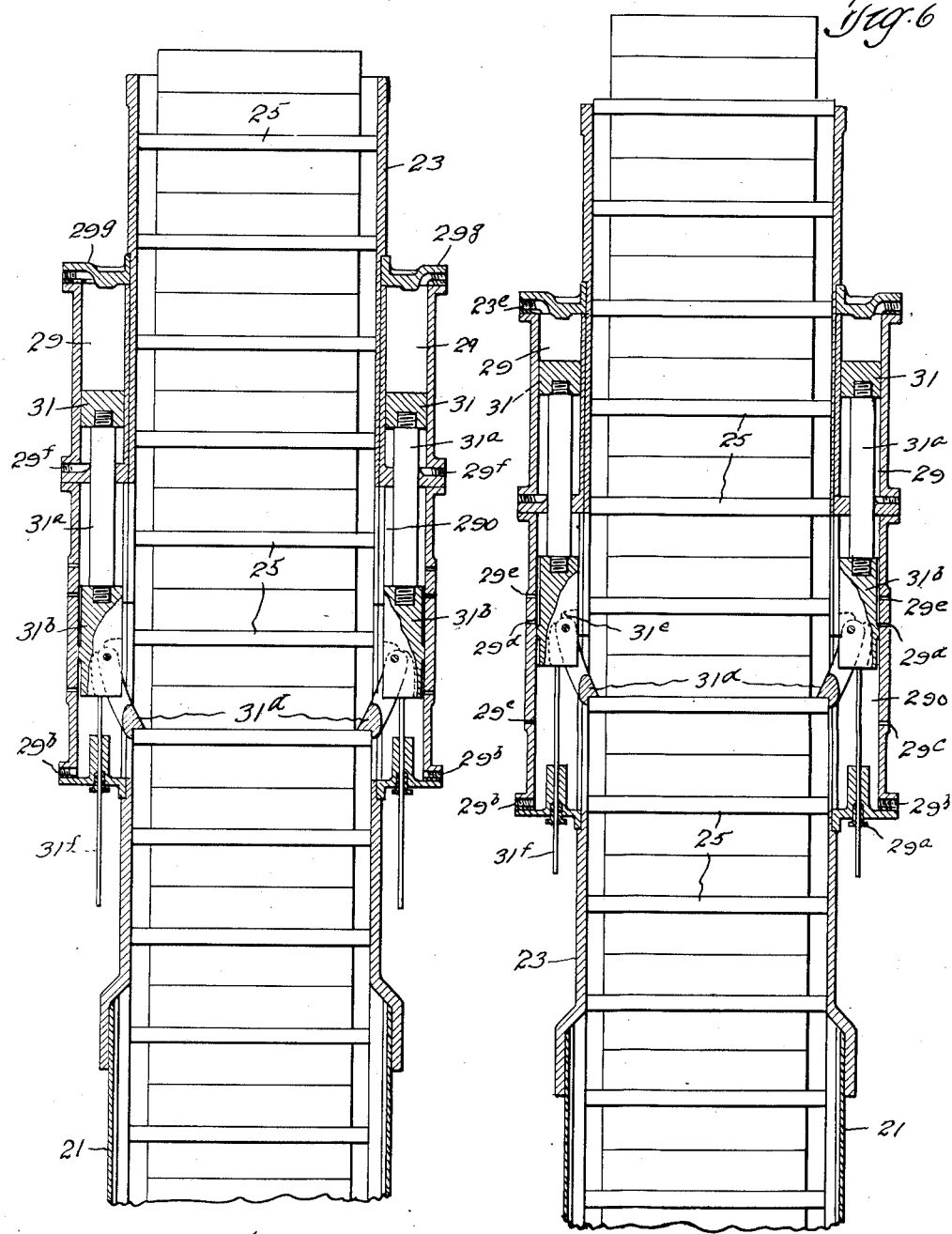

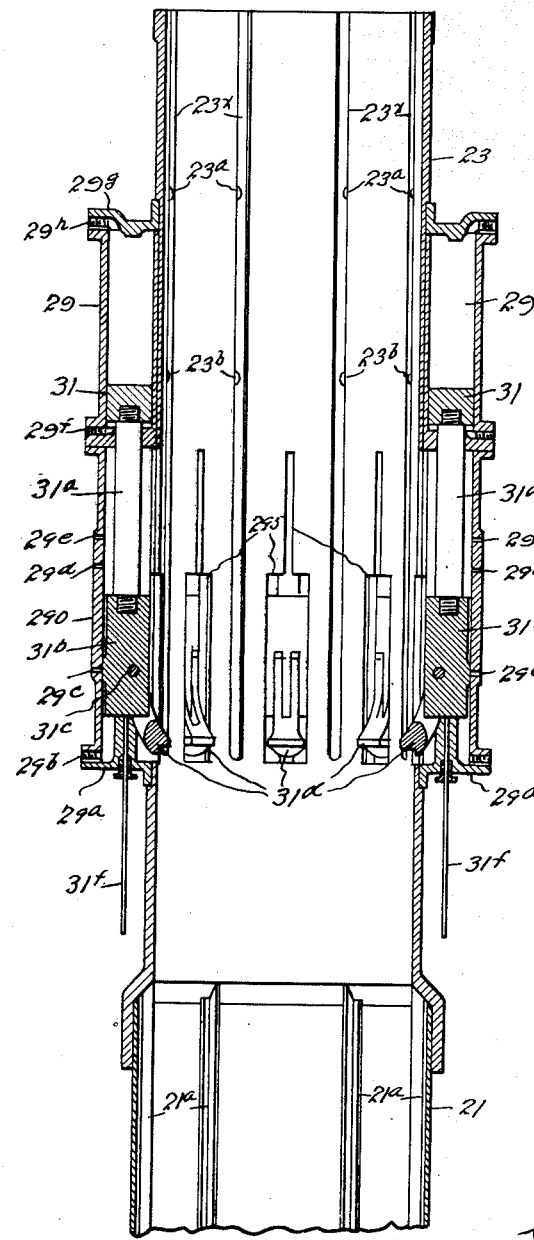

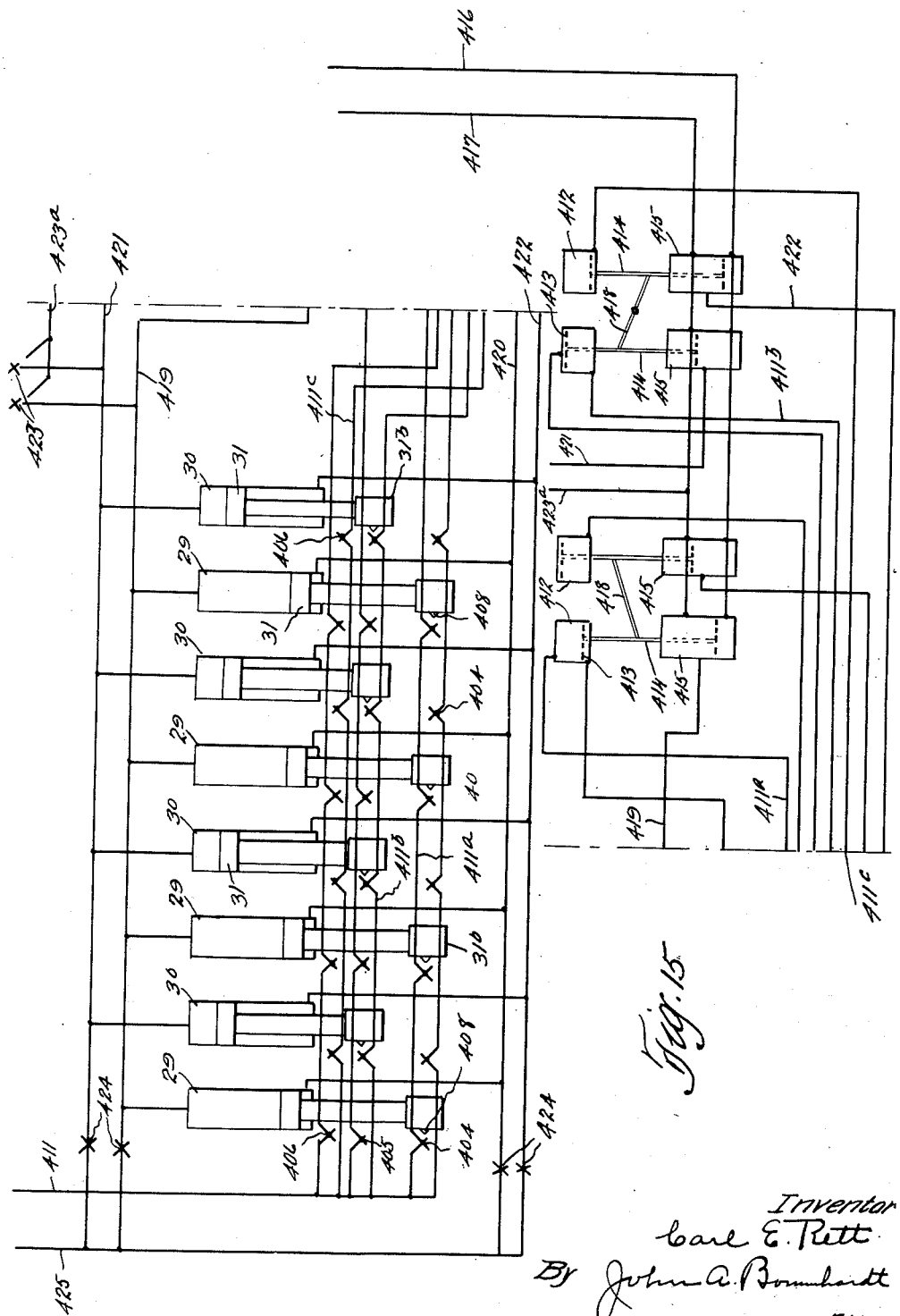

Patented July 17, 1928.

1,677,207

UNITED STATES PATENT OFFICE.

CARL E. RETT, OF AKRON, OHIO, ASSIGNOR TO CLIFFORD H. OAKLEY, OF TRENTON, NEW JERSEY.

CONTINUOUS VULCANIZER.

Application filed January 29, 1921, Serial No. 440,886. Renewed October 8, 1921, and renewed February 14, 1923. Serial No. 506,489.

This invention relates particularly to machines for the vulcanization of rubber tires under hydraulic pressure while they are in the molds, but is capable of use for other purposes in which the heating of articles is to be effected by steam or otherwise, and although described particularly with reference to the vulcanization of tires, it is to be understood that no limitation is implied with reference to the uses of the apparatus.

The object of the invention is to provide an apparatus in which the vulcanization or heating as well as the hydraulic pressure may be carried on in a continuous manner. As applied to tires, the molds containing the tires are advanced by hydraulic pressure through a cylinder to which steam is supplied, and hydraulic pressure is applied continuously to each and every mold, the heat of the steam performing the vulcanizing action. A continuous operation has many advantages over intermittent operations, as the latter usually require that the heating chamber be opened to admit and remove the molds. By the present apparatus, the molds containing the tires are fed into the lower end of an upright cylinder, in which they are subjected to heat and to pressure from above by hydraulic devices, and they are carried upwardly through the cylinder and are finally discharged from the top by the automatic escapement action of the hydraulic devices that produce downward pressure, permitting the removal of the upper molds without interrupting the operation of the machine and without releasing the pressure on the molds in process. The upper hydraulic devices in addition to producing downward pressure have a limit of pressure exceeded by, and yielding to, the pressure exerted by the lower hydraulic devices when molds are inserted. The time of vulcanization is controlled by the frequency with which the tires contained in the molds are inserted in the bottom of the machine which frequency is also governed by the height to which the machine is built, the thickness and size of the molds and the various requirements due to process.

For controlling the various hydraulic mechanisms I provide valves operated by compressed air in such manner that the operation is practically automatic and the vulcanization and hydraulic pressure can proceed continuously after it is once started.

The main object and idea of the apparatus is therefore to provide a heating or vulcanizing chamber in which the articles are constantly introduced at one end by hydraulic pressure, submitted to heat and pressure, and released through a bath of cooling water thereby subjecting the articles to the progressive treatment required by the process. The machine as a whole may extend through several floors of a building, the inlet to the chamber being preferably at the bottom and the outlet at the top. But it may be arranged otherwise if desired.

One form of the invention is illustrated in the accompanying drawings in which Fig. 1 is an elevation of the machine, parts being omitted for the sake of clearness. Figs. 2, 3 and 4 are vertical sections of the lower end of the machine with the parts in different positions. Figs. 5, 6 and 7 are vertical sections of the upper end of the machine with the parts in different positions. Fig. 8 is a view similar to Fig. 7, the molds and piston plate shown in Fig. 7, being omitted. Fig. 9 is a cross-section on the line 9—9 of Fig. 1. Fig. 10 is a cross-section on the line 10—10 of Fig. 7. Fig. 11 is a detail in section of one of the follower pistons which are placed between the molds. Fig. 12 is a plan of one of said pistons. Fig. 13 is a sectional view on the line 13—13 of Fig. 1 showing part of the controlling valve mechanism. Fig. 14 is a detail of one of the controlling valves. Fig. 15 is a diagram of the controlling valve mechanism.

The body proper of the heating chamber consists of a shell or cylinder 21 of boiler plate of sufficient thickness, placed in a vertical position and made steam tight with the lower end attached to lower body casting 22, in a strong manner and the upper end attached to upper body casting 23. This shell or cylinder may extend through several floors A of the building, as shown in Fig. 1. Both castings 22 and 23 are of steel and drilled, tapped and otherwise machined to receive the various appurtenances as illustrated. On the inside surface of 21 is placed six (more or less) steel rails, 21ᵃ, riveted to same parallel with each other and extending from casting 22 to casting 23, the face of the rails nearest the axis of shell 21, being flush and in line with the interior faces of castings 22 and 23. The whole arrangement is such that the interior faces of rails 21ª and castings 22 and 23 are in the same vertical circumferential plane. Rails 21ª not only serve the purpose of guiding the piston plates 25 in their travel through the machine but also serve the purpose of strength when the machine is in operation. Also attached to shell 21 are two (more or less) pipe connections, 21ᵇ, to take pipes of suitable size and serving to convey steam of predetermined pressure to the interior of the shell 21, from a source of exterior supply. Connections 21ᵇ open at the rear of rails 21ª which permits the rear face of the rails 21ª to act as baffle plates and prevent steam from striking the product directly as it passes through the machine. Steam entering at 21ᵇ circulates without difficulty around the molds in the chamber 21 and between the pistons 25, as the molds and pistons are spaced from the wall of the chamber by the rails 21ª, and no escape of the steam takes place, except as it condenses, the condensation escaping through the outlets 22ᵍ. The lower body 22 is a steel casting supporting body 21 and is supported by legs 24 in a secure manner as indicated in Figs. 1 to 4. On the lower edge of casting 22 and integral with same are eight (more or less) latch pockets 22ª which extend radially from the casting and are so arranged that drilling operations can easily be performed. Stiffening webs are arranged to insure strength of the casting at these places. Each of these pockets is provided with a steel latch 22ᵇ, steel pivot pin 22ᶜ, steel spring 22ᵈ and steel spring sockets 22ᵉ. The springs 22ᵈ are in compression and are supported by spring sockets 22ᵉ which in turn are secured to lowest lip of pocket by bolts and to lower face of latch 22ᵇ, by bolts or other suitable means. The latch 22ᵇ is free to rotate on steel pin 22ᶜ, which pin extends through latch and pocket walls and is prevented from slipping out by exterior means. The latches are thus free to swing out to permit molds to enter the cylinder.

There is a stop provided on each latch 22ᵇ, as indicated by 22ᶠ, which prevents the spring 22ᵈ from forcing the latch 22ᵇ too far inwardly toward the axis of the machine and always keeps the latches in line. The lower part of latch 22ᵇ tapers to a sufficient degree to insure that a piston plate 25 coming up from below will force the latches outwardly or radially against the pressure of the springs 22ᵈ. After the piston plates pass the points of the latch the action of the springs 22ᵈ tend to restore all latches to normal position.

As the upper edge of casting 22 are holes 22ᵍ of suitable size to take away condensate produced by the action of steam on the cold surfaces in the heat chamber 21. These holes are so located as to drain the extreme bottom of chamber 21. Attached to casting 22 are four steel legs 24 which support the entire superstructure as well as the weight of equipment when in operation. The internal diameter of casting 22 is slightly in excess of the total outside diameter of a piston plate 25, except piston rings 25ª.

The legs 24 are supported on a steel or cast iron bed plate 26 which in turn is to be supported by the foundation and securely bolted thereto. The function of the bedplate is not only to distribute the load of the machine but also to always maintain the respective axis of machine and hydraulic ram below in the same straight line.

In Fig. 1, the front leg has been removed in order that the equipment behind same can be more easily shown and indicated.

A hydraulic steel cylinder 27 is supported in the bedplate 26 in the manner indicated and is fitted at its upper end with a gland and stuffing box, 27ª and 27ᵇ. Gland ring 27ª, is secured to cylinder 27 by steel bolts in sufficient number and arranged so that the stuffing box may be adjusted for tightness at will.

Provision for introducing hydraulic pressure from an exterior supply into cylinder 27 is made by pipe tapping and inlet at 27ᶜ. Working up and down in the cylinder 27 is the steel ram 28 of suitable stroke for the case in hand. This ram is so arranged that it will not twist or turn when in operation. Secured on top of ram 28 is the steel ram cap or table 28ª and this cap has spacing lugs 28ᵇ integral with same and equally spaced radially so that the axis of a piston plate 25, when laid on same will be in exact line with the axis of the entire machine.

Referring now to the top of the machine, steel casting 23 is the upper body and on it is supported the mechanism for producing downward pressure on the piston plates. There are two or more sets of hydraulic cylinders 29 and 30 and guide cylinders 290 and 300 spaced about the exterior of the casting 23, and these are all securely bolted to the upper body 23, which is also provided with longitudinal inner grooves 23ˣ and suitable tapping for water pipes which are located between cylinders 29 and 30. The upper cylinders 29 and 30 are arranged for hydraulic pressure while the lower cylinders 290 and 300 act as guide cylinders only but must be pressure tight nevertheless.

Moving up and down in each cylinder 29 and 30 is a plunger 31 attached to a connecting rod 31ª which in turn is connected to a crosshead 31ᵇ in the corresponding cylinder 290 and 300. Connected to each head 31ᵇ by means of pin 31ᶜ is a "shoe link" or catch 31ᵈ. These catches swing in and out through slots in the wall of the casting 23 and the tip of each catch extends inwardly and radially toward the axis of the machine but is prevented from going too far by the stop 31ᵉ. Each catch 31ᵈ is also arranged so that its motion in the opposite direction or swing outwardly is arrested by striking an indicator rod 31ᶠ when the plunger is in its upward position as shown in Fig. 7.

The bottom of cylinders 290 and 300 are fitted with combination stuffing boxes and bumper ends 29ᵃ, and are also fitted with drain openings 29ᵇ.

The holes at 29ᶜ, 29ᵈ, 29ᵉ in the respective sets of cylinders are used for the controlling mechanism as hereinafter described.

At the bottom of each of the cylinders 29 and 30 is a pipe tapping 29ᶠ used for conveying hydraulic pressure under plunger 31. The head of the cylinders 29 and 30, indicated by 29ᵍ is tapped at 23ᵉ for a hydraulic pressure pipe same being used to convey pressure to the upper side of plunger 31.

In the utilization of this machine as a vulcanizer for rubber tires and other rubber products in the rubber industry it is intended that the entire chamber of upper body 23 from drain outlet 29ᵇ to overflow outlet 23ᵇ (Fig. 8) be filled with water to aid in the cooling process. In the utilization of this machine as a cooker for other industries it may not be necessary to use cooling water in which event openings 23ᵃ and 23ᵇ need not be used.

The operation of the parts thus far described is as follows:

It is to be understood and remembered that the catches 31ᵈ are arranged in two gangs or sets of four each, one set being operated by the pistons in the cylinders 29 and the other set being operated by the pistons in the cylinders 30, and the individuals of the respective sets are located in alternation around the main cylinder, and the two sets as a whole act alternately. That is, one set is engaged while the other set is released, and one set is rising while the other is falling, so that there is always a resistance to the rising stack of molds, and when one set of catches is released to disengage the uppermost molds, the other set has engaged the molds below, holding the stack of molds under pressure at all times, but giving a release of the uppermost molds first by one set and then by the other. Also it is to be understood that as the catches and pistons 31 are forced upwardly by the hydraulic pressure on the bottom of the stack, the pressure in the cylinders 29 or 30 constitutes a yielding resistance to such movement, which produces an effective pressure on the molds.

So in operation the molds are centered on the ram head 28ᵃ which is then lifted by the hydraulic press and the molds are forced up into the lower end of the main cylinder, the catches 22ᵇ yielding to allow the molds to pass. The molds are separated by the pressure plates 25, and the catches engage under the edge of a plate and thus hold or support the stack of molds in the column.

Assuming that the column or main cylinder is full of molds, one set of catches 31ᵈ will engage one of the pressure plates as shown in Fig. 5, and the stack being then forced up by additional molds inserted at the bottom, the whole stack will gradually rise against the resistance in the small cylinders at the top, say the cylinders 29. At the same time the other set of catches operated by the cylinders 30 will be falling, and when they reach low position will be swung inwardly to engage a pressure plate on the following molds, the inward swing being effected by the back edge of the catches riding along the tubular extensions on the heads 29ᵃ and so this second set of catches will take up the thrust from below. Meanwhile, pressure is exhausted through the port 29ʰ at the top of each cylinder 29, and pressure is let in through the port 29ᶠ at the bottom, and this will lift the pistons and the first set of catches from engagement with the upper pressure plate and said catches will be swung out by contact of the inner edge thereof with the top of the slots 295 through which the catches work, and as the stack of molds continue to rise they will lift out of the top of the main cylinder and can be taken off and removed. Fig. 5 shows one set of catches partly moved upward, and Fig. 6 shows the catches just before they are released. While the molds are passing through the cylinder 21 they are heated by the steam enclosed therein, and the tires are thereby vulcanized, it being understood that the rate of travel is slow enough to give the necessary time for this operation, and this time can be controlled by controlling the rate of movement of the parts by controlling the pressures applied to the hydraulic ram below and the resistance catches above by the speed with which the molds are inserted. The control of the two sets of pistons 31 is also such that the catches carried by one set will take hold before the catches carried by the other set are released. The pressure plates or pistons 25 are provided with packing rings so that these plates, as they enter the neck of the upper casting 23 seal the chamber 21 at the top, and also seal the chamber 21 at the bottom as they pass through the casting 22. Accordingly there is no chance for the escape of steam. Nor is there any chance for the cooling water in the upper part of the casting 23 to flow downward into the chamber 21. Accordingly the molds may be fed in at the bottom of the apparatus in a continuous manner, and after vulcanization are removed from the top, and so a continued operation may be effected for the intended purpose. The indicator rods 31', working through the lower ends of the cylinders 290 and 300, indicate the location of the catches and the condition of the operation within the cylinders. It may be mentioned that in beginning operation, before the steam is turned on, dummy molds may be used to get a complete stack; and dummy molds can also be used when the machine is put out of operation to clear the column of filled molds. The size of the molds can be varied in thickness, provided the piston plates 25 do not come too close together. For cooking or other purposes the cans or articles to be cooked can be inserted between the pressure plates, and so forced through the machine by appropriate pressure in accordance with the nature of the articles. And electric or other heating mediums can be used instead of steam.

For controlling the various movements above described I have devised the mechanism shown in diagram in Fig. 15, and in detail in Figs. 13 and 14, these parts being omitted from the other figures for the sake of clearness. To the outer side of each cylinder 290 and 300 there is attached a casing 400 which encloses a valve mechanism, these mechanisms being identical, so a description of one will answer for all. Through glands at the ends of the holes 29$^c$, 29$^d$ and 29$^e$ work valve stems, these stems being indicated at 401, 402 and 403 respectively, and connected respectively to valves 404, 405 and 406, these valves controlling the compressed air by which the hydraulic valves are operated. The inner ends of the stems 401, 402 and 403 are bevelled or rounded, and work in a groove 407 in each sliding head 31$^b$, but they may be pushed out by contact therewith by a bevelled cam lug 408 located in the groove, said cam being integral with crosshead 31$^b$. The stem 401 is connected by a lever 409 to the stem 402, so that when one is pushed out the other is moved in, and the stem 403 is connected by a tappet arm 410 so that when the stem 403 is pushed out the stem 402 is also pushed out, but will not be pushed in until the stem 401 is pushed out.

Referring now to the diagram, Fig. 15, compressed air is introduced to the valves through a line 411, and branches from this line lead to the valves 404, 405 and 406 respectively. It will be noted that the connections are in series, one series including the valves of the cylinders 29 and the other series including the valves of the cylinders 30, and these branch lines are connected in pairs to opposite ends of air cylinders 412, (except one which needs no connection) and each of these cyliders contains a piston 413 which is connected by a rod 414 to a hydraulic valve 415 shown in detail in Fig. 14. This is a spool valve controlling the hydraulic lines 416 and 417, the former leading from a source of hydraulic pressure supply and the latter leading to waste. The valves 415 are arranged in two pairs and the stems of each pair are connected by a lever 418 so that the valves move in opposite directions when either one is operated. From one of the valves a line 419 extends to the inlet 29$^g$ of the cylinders 29. From the next valve 415 a line 420 extends to the port 29$^f$ of the same set of cylinders. From the next valve 415 a line 421 extends to the top inlet of the cylinders 30, and from the remaining valve 415 a line 422 extends to the bottom connection of the cylinders 30. Relief valves 423 are located in the respective lines 419 and 421, and the lines 419, 420, 421 and 422 are all connected through check valves 424 to a service water line 425. The hydraulic pressure supplied through the line 416 may be as much as 750 lbs, while the service water pressure supplied through the line 425 may be as low as 65 lbs, and of course these pressures may be varied according to the work in hand.

Taking the position of the pistons in the cylinders 29 in Fig. 15, the valves 405 and 406 are closed, but the valves 404 are open, as shown in Fig. 13. This lets air pass through the branch 411 of the compressed air line into the upper end of one of the cylinders 412 forcing the piston 413 down and shifting the valve 415 to the position shown in Fig. 15, and in this position the hydraulic pressure of the pipe 416 is communicated through the valve 415 and through the line 419 to the upper end of the cylinders 29, thereby creating a back pressure in said cylinders which resists, but does not prevent the lift of the stack of molds in consequence of the main hydraulic ram at the bottom of the column. So the pressure will be relieved through the relief valves 423 and the surplus water will pass by the line 423$^a$ to the waste line 417.

At the same time the pistons in the cylinders 30 are approaching the upper end of their strokes and by means of the cams 408 have opened the valves 405 in the branch air line 411$^b$, and the air flowing through this line shifts the piston 413 in the corresponding cylinder 412 thereby operating the valve 415 to allow escape of the hydraulic pressure through the line 421 to the waste line 417, and the same operation by means of the lever 418 operates the next valve 415 to admit hydraulic pressure below the piston 31 in each cylinder 30 to lift said pistons and thereby disengage the catches. When the pistons 31 reach the point where the cam 408 strikes the valve rod 403 the valve 406 is opened, letting air through the line 411$^c$ to the remaining cylinder 412, thereby shifting the position of the appropriate valves 415 to cut off pressure from both sides of the pistons 31 and connect the waste line 417 with the lower ends of said cylinders 30, permitting the pistons and catches to drop and engage the stack of molds as above described. The described operation is thus repeated when the pistons in the cylinders 29 lift. In each case the action is first to supply hydraulic pressure to the upper sides of the pistons in the cylinders and to relieve the pressure as the pistons are forced up by the pressure from below; then to relieve the pressure above the positions and let it in below the pistons to lift the pistons the remaining distance to disenagage the catches; and then to relieve the pressure so that the pistons and catches may drop to position for the next operation. The operation of each set of the valves shown in Fig. 13 is identical with the valves with which it is in series, that is for all four cylinders of each set, and the valve operation is automatic with the operation of the main apparatus, requiring no manual operation after it is once started.

Reference has been made, above, to the fact that water for cooling purposes is contained within the chambers of the upper casting 23, so that the water will circulate within said casting and around the molds, being introduced through the inlet 23$^a$ through which water may be sprayed on to the molds, the height of water being controlled by the overflow outlets 23$^b$, the water filling the middle part of the casting, and having a circulation through the groove 23$^x$ and also through the cylinders 290 and 300 and the connecting slots in which catches 31$^d$ work. This feature is of importance in vulcanizing operations. After the molds pass out of the heating chamber 21 and into the upper casting 23 they are subjected to the action of this cooling water, whereby the molds and the articles therein are cooled to the requisite temperature. This cooling action follows the heating directly, as the molds pass hrough the apparatus, the water entering from the grooves and the adjacent cylinders, between the plates 25 and so circulating around the molds.

Another advantageous feature results from the upright arrangement of the heating chamber and the location of the outlets 22$^g$ at the bottom of said chamber. It will be understood that steam at a certain pressure, say 45 lbs., is admitted into the heating chamber, and when cold molds are inserted at the bottom the resulting condensation is formed at the bottom in its greatest quantity, and immediately escapes through the outlets, which is advantageous as compared to prior vulcanizers wherein all the molds are subjected at once to the heating medium, and condensate is formed too rapidly for pipes to carry it away immediately, resulting in the lowest molds being in water most of the time, which sometimes causes under- cured tires or other articles. By the present invention the condensate is carried off at the low point of the chamber, as fast as it is formed, and so the molds are subject to a proper heating action.

It may also be explained that molds of various thicknesses and diameters may be used, because they are separated by the piston plates 25 which fit the heating chamber, and these plates may be spaced apart more or less according to the thickness of the molds. This does not affect the escapement action, because if the plates are too close together the catches 31$^d$ will skip one and take the next following, only provided that the plates are far enough apart to permit the catches to work, and the release is automatic with the feed and does not depend on any particular spacing of the plates, nor does it require any particular synchronous actuation.

The period of time of vulcanization or heating is dependent entirely on the speed at which the articles are inserted at the bottom, and the rapidity of this operation can be varied according to the nature of the work and other local conditions, which can be readily learned by an operator.

It may be also mentioned that as above explained the controlling valves are connected in series to the upper cylinders. Valves on one cylinder of each set could be used, but by connecting all the valves in series, if one latch should not operate, the machine will not operate, and this prevents clogging or wedging of the plates which might otherwise occur.

I claim:

1. The combination of a heating chamber adapted to receive a line or stack of articles to be heated, means to force said articles progressively through the chamber, means to supply a fluid heating medium into the chamber, and means carried with said articles to seal opposite ends of the chamber while said articles are being forced therethrough.

2. The combination of a tubular heating chamber open at both ends and adapted to receive a line or stack of articles to be heated, means to force said articles into one end, through the chamber, and out at the other end, means to supply a heating fluid into said tubular heating chamber in contact with said articles to be heated, and means traveling with said articles to seal opposite ends of the chamber while said articles are being forced through the same, whereby a heating fluid is confined in the chamber.

3. The combination of a tubular vulcanizing chamber open at both ends and provided with means to supply a heating fluid thereto, means to force a line or stack of articles to be heated through the chamber, and means carried by said articles to confine the heated fluid in the chamber during the travel of the articles therethrough.

4. The combination of an elongated cylinder open at both ends, means to supply a fluid heating medium into said cylinder and in contact with articles therein, means at one end of the cylinder to force articles progressively through the same, and means at the other end of the cylinder to yieldingly resist said forcing action, whereby the articles are subjected to pressure while passing through the cylinder.

5. The combination of an elongated heating chamber adapted to receive a line or stack of articles to be heated, said chamber being open at both ends, means to supply a heating fluid to the chamber between its ends, means at one end of the chamber to force articles progressively through the same, means at the other end of the chamber to yieldingly resist the passage of articles through the same, whereby said articles are subjected to pressure, while in the chamber, and means traveling with the articles to seal opposite ends of the chamber, whereby the heating fluid is confined in the chamber.

6. In a vulcanizer, the combination of an elongated cylinder open at both ends, means to force a line or stack of molds into one end of the cylinder and through the same and out at the other end, and means to supply a fluid heating medium into the intermediate portion of the cylinder and in contact with the molds therein.

7. In a vulcanizer, the combination of an elongated cylinder open at both ends, means to force a line or stack of molds into one end of the cylinder and through the same and out at the other end, means to admit a heating fluid into the interior of said cylinder to heat the intermediate portion thereof, and fluid pressure means at the outlet end of the cylinder to yieldingly resist the travel of the molds through the cylinder, whereby said molds are subjected to pressure while in the cylinder.

8. The combination of an elongated heated chamber open at both ends, means to force a line or stack of articles to be heated into one end of the chamber and through the same and out at the other end, means to supply a heating fluid into said tubular heating chamber in contact with said articles to be heated, and a series of piston plates adapted to be placed between the articles and to seal the tubular chamber against the passage of heating fluid, and movable therewith through the chamber.

9. The combination of a cylinder open at both ends and enlarged between its ends, means to supply a heating fluid to the enlarged part of the cylinder, means to force articles into one end of the cylinder and through the same, and out at the other end, said articles being arranged in a continuous line, and a series of piston plates adapted to be placed between the articles to move therewith through the cylinder, said piston plates colsely fitting the end portions of the cylinder, whereby to confine the heating fluid in the enlarged part thereof.

10. The combination of a heated chamber open at both ends, a press at the inlet end of the chamber adapted to force articles through the same, catches at the inlet of the chamber, adapted to retain said articles when the pressure is released, and yielding fluid pressure actuated catches at the outlet end of the chamber engageable with said articles to resist the movement thereof through said outlet end, whereby they are subjected to pressure while in the chamber.

11. The combination of an elongated cylinder open at both ends, means to heat the intermediate portion of the cylinder, a press at the inlet end of the cylinder adapted to force articles into and through the same, and a plurality of sets of alternately operating catches at the outlet end of the cylinder, engageable in alternation with said articles to resist the movement of the same through the cylinder, and means to apply a yielding pressure to said catches, said pressure being inferior to the force by which the articles are moved through the cylinder.

12. In a vulcanizer, the combination of an elongated cylinder open at both ends, means to supply heating fluid to the intermediate portion of the cylinder, a press at the inlet end of the cylinder adapted to force articles into and through the same, a series of pressure plates fitting within the cylinder and adapted to be placed between the articles and to travel therewith through the cylinder, and means at the outer end of the cylinder, engeageable with said plates, to yieldingly resist the travel of the articles and plates through the cylinder, said plates also sealing the opposite end portions of the cylinder as they pass through the same.

13. In a vulcanizer, the combination of a cylinder and means to supply a heating fluid thereto, means to force a continuous line of articles to be vulcanized through said cylinder and means traveling with said articles to confine the heating fluid in the cylinder as the articles pass therethrough.

14. The combination with a tubular heating chamber, and means to force articles therethrough, of means at the outlet end of the chamber to apply a resistance to the movement of said articles and means to supply a fluid heating medium into the chamber.

15. The combination with a tubular heating chamber, and means to force articles therethrough, of means at the outlet end of the chamber to apply a resistance to the movement of said article, comprising a plurality of sets of reciprocating catches engageable with said articles, and fluid pressure devices yieldingly supporting said catches while they are engaged with said articles.

16. The combination with a tubular heating chamber, and means to force articles therethrough, of means at the outlet end of the chamber to apply a resistance to the movement of said article, comprising a plurality of sets of reciprocating catches engageable with said articles and fluid pressure devices yieldingly supporting said catches while they are engaged with said articles, and automatic valve controlling mechanism governing the application of pressure to said devices.

17. The combination with a heated cylinder and means to force articles through the same, of two sets of catches at the outlet end of said cylinder, said catches being yieldingly supported to resist the movement of the articles through the cylinder, means to alternately engage and disengage the catches of the respective sets with some of said articles, and means to shift the catches, after each disengagement, along the cylinder to a new position for reengagement with said articles.

18. In a vulcanizer, the combination of an upright elongated cylinder open at top and bottom, means to force articles to be vulcanized into the bottom of the cylinder and upwardly through the same, and out at the top, means to supply steam to the interior of the cylinder and an automatically acting escapement device at the top of the cylinder, said device being yieldingly supported and being engageable with articles to resist the travel of the articles through the cylinder and being intermittently disengageable therefrom to permit the release of the topmost articles.

19. The combination of a heating chamber, means to force articles through the same, yieldingly supported escapement devices at the outlet end of the cylinder, engageable with said articles to resist the passage thereof, said devices including two sets of catches engageable and disengageable in alternation, whereby when articles are released by one set the following articles are engaged by the other set.

20. The combination with a heating cylinder and means to force articles through the same, of yielding catches at the outlet end of the cylinder, and fluid pressure devices operatively connected to said catches.

21. The combination with a heating cylinder and means to force articles through the same, of yielding catches at the outlet end of the cylinder, fluid pressure devices operatively connected to said catches, and an automatic valve controlling mechanism governing the supply of fluid pressure to said devices.

22. The combination with a heating cylinder and means to force articles through the same, of yielding catches at the outlet end of the cylinder, fluid pressure devices operatively connected to said catches, and automatic valve controlling mechanism governing the supply of fluid pressure to said devices, said mechanism including cam devices carried by the catches, and fluid pressure actuated valves controlled by said cam devices.

23. The combination with a heating chamber and means to force articles through the same, of a plurality of sets of catches at the outlet end of the cylinder, said sets being alternately engageable with said articles and disengageable therefrom, fluid pressure pistons connected to the catches, means to apply fluid pressure to one side of the pistons to resist the movement of the catches when engaged with said articles, means to apply fluid pressure to the other side of the pistons to release said catches from the articles, and means to shift the catches to original position to engage the same with following articles.

24. The combination with a heating chamber and means to force articles through the same, of a plurality of sets of catches at the outlet end of the cylinder, said sets being alternately engageable with said articles and disengageable therefrom, fluid pressure pistons connected to the catches, means to apply fluid pressure to one side of the pistons to resist the movement of the catches when engaged with said articles, means apply fluid pressure to the other side of the pistons to release said catches from the articles, and means to shift the catches to original position to engage the same with following articles, and automatic means of controlling the operation of said fluid pressure means.

25. The combination with the heating cylinder and means to force articles through the same, of the resistance catches 31$^d$ engageable with said articles, and indicating devices connected to said catches.

26. The combination with a heating cylinder open at both ends, and means to force articles into the cylinder and through the same, of a series of small cylinders mounted on the outlet end of the main cylinder, pistons in said small cylinders, catches connected to said pistons and engageable with said articles, and fluid pressure means to control the movement of said pistons, whereby to alternately engage and release the catches.

27. The combination with a heating cylinder and means to force articles into and through the same, of a plurality of sets of small cylinders mounted on the outlet end of the main cylinder, pistons in said small cylinder, sets of catches connected to the pistons and engageable with articles in the main cylinder, and fluid pressure means to operate the respective sets of pistons and catches in alternation to engage and disengage the articles, said catches when engaged acting to resist the movement of the articles through the main cylinder.

28. The combination with a heating cylinder and means to force articles into and through the same, of a plurality of sets of small cylinders mounted on the outlet end of the main cylinder, pistons in said small cylinders, sets of catches connected to the pistons and engageable with articles in the main cylinder, and fluid pressure means to operate the respective sets of pistons and catches in alternation to engage and disengage the articles, said catches when engaged acting to resist the movement of the articles through the main cylinder, and an automatic valve controlling mechanism governing the supply of fluid pressure to the small cylinders and pistons.

29. The combination with a heating cylinder and means to force articles into and through the same, of a plurality of sets of small cylinders mounted on the outlet end of the main cylinder, pistons in said small cylinders, sets of catches connected to the pistons and engageable with articles in the main cylinder, and fluid pressure means to operate the respective sets of pistons and catches in alternation to engage and disengage the articles, said catches when engaged acting to resist the movement of the articles through the main cylinder, and an automatic valve controlling mechanism governing the supply of fluid pressure to the small cylinders and pistons, said mechanism including sets of pressure controlled valves corresponding with and connected to the sets of small cylinders.

30. In a vulcanizer, the combination of an elongated cylinder enlarged between its ends, rails extending lengthwise in said enlarged part of the cylinder, means to force a line or stack of articles into one end of the cylinder and through the same and out at the other end, means to supply a heating medium to the enlarged part of the cylinder, and a plurality of piston plates movable through the cylinder and having a close fit with the end portions thereof, to seal the enlarged portion, said piston plates being located between the articles and traveling along said rails in the enlarged part of the cylinder.

31. The combination of a tubular vulcanizing chamber open at both ends and provided with means to supply a heating fluid thereto, means to force a line or stack of articles to be heated through the chamber, and means to confine the heating fluid in the chamber during the travel of the articles therethrough, and means at the outlet end of the chamber to apply a cooling fluid to said articles.

32. The combination of a tubular vulcanizing chamber open at both ends and provided with means to supply a heating fluid thereto, means to force a line or stack of articles to be heated through the chamber, and means to confine the heating fluid in the chamber during the travel of the articles therethrough, and means at the outlet end of the chamber to apply a cooling fluid to said articles, comprising fluid supply and outlet passages communicating with the interior of said chamber at said end thereof, whereby to provide a circulation of fluid around said articles.

33. In a vulcanizer, the combination of an elongated cylinder open at both ends, means to force a line or stack of molds into one end of the cylinder and through the same and out at the other end, means to heat the intermediate portion of the cylinder, and means at the outlet end of the cylinder to continuously and uninterruptedly maintain a yieldable resistance to the travel of the molds through the cylinder, whereby said molds are subjected constantly to pressure while in the cylinder, and means to cool the outlet end portion of the cylinder and the molds therein.

34. The combination of an upright heating cylinder, means to force articles through said cylinder in a continuous line, means to supply a heating fluid into the interior of said cylinder in contact with said articles, to heat said articles, and an outlet for condensate, near the lower end of said cylinder.

35. In apparatus of the character described, in combination, a heating chamber having tubular feeding and discharge portions, a series of work carriers and means for moving said carriers continuously through said chamber, said carriers being constructed to form substantially fluid tight connection with the walls of said feeding and discharge portions of the chamber, means for admitting a heating medium to the intermediate portion of said heating chamber and into contact with said work carriers.

36. In a vulcanizing apparatus, the combination with a heating cylinder opened at both ends of means to admit heating fluid to the interior of said cylinder in contact with molds therein, means to move a series of molds through said cylinder in a straight line and means to seal both ends of said cylinder to prevent escape of heating fluid from said cylinder while permitting movement of the molds therethrough, together with means for admitting heating fluid under pressure to the interior of said cylinder.

In testimony whereof, I do affix my signature.

CARL E. RETT.